U S011073945B1

(12) United States Patent
Pundak et al.

(10) Patent No.: US 11,073,945 B1
(45) Date of Patent: Jul. 27, 2021

(54) NOISE COMPENSATION FOR TOUCH-SENSITIVE DISPLAY DEVICE

(71) Applicant: Microsoft Technology Licensing, LLC, Redmond, WA (US)

(72) Inventors: Gilad Pundak, Rehovot (IL); Nadav Linenberg, Even Yehuda (IL); Dmitry Birenberg, Rosh ha Ayin (IL); Matan Slassi, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/003,821

(22) Filed: Aug. 26, 2020

(51) Int. Cl.
*G06F 3/041* (2006.01)
*G06F 3/0354* (2013.01)
*G06F 1/16* (2006.01)

(52) U.S. Cl.
CPC ........ *G06F 3/04182* (2019.05); *G06F 1/1647* (2013.01); *G06F 1/1681* (2013.01); *G06F 3/03545* (2013.01); *G06F 2203/04104* (2013.01); *G06F 2203/04107* (2013.01)

(58) Field of Classification Search
CPC .. G06F 1/1647; G06F 3/0418; G06F 3/04182; G06F 3/03545
See application file for complete search history.

(56) References Cited

U.S. PATENT DOCUMENTS

| | | | |
|---|---|---|---|
| 6,081,259 A * | 6/2000 | Teterwak | G06F 3/04164 345/173 |
| 6,175,773 B1 | 1/2001 | Reiffel et al. | |
| 9,557,868 B2 | 1/2017 | Agarwal et al. | |
| 9,939,975 B2 | 4/2018 | Ye et al. | |
| 10,067,575 B2 | 9/2018 | Agarwal et al. | |
| 10,256,658 B2 | 4/2019 | Hyun et al. | |
| 10,613,643 B2 | 4/2020 | Shahpamia et al. | |
| 2014/0267100 A1 * | 9/2014 | Sohn | G06F 3/0416 345/173 |
| 2016/0370912 A1 * | 12/2016 | Qiao | G06F 3/0441 |

OTHER PUBLICATIONS

Ard, Chris, "Distinguishing signal from noise", Retrieved from: https://www.newelectronics.co.uk/electronics-technology/distinguishing-signal-from-noise/198005/, Dec. 6, 2018, 4 Pages.

* cited by examiner

*Primary Examiner* — Laurence J Lee
(74) *Attorney, Agent, or Firm* — Alleman Hall Creasman & Tuttle LLP (57) ABSTRACT

A touch-sensitive display device includes a first touch-sensitive display including a first plurality of display electrodes configured to detect proximity of input objects to the first touch-sensitive display, and a second touch-sensitive display including a second plurality of display electrodes configured to detect proximity of input objects to the second touch-sensitive display. A touch controller detects a non-stylus touch input at a first display electrode of the first touch-sensitive display based on a first signal from the first display electrode, and a stylus touch input from a stylus at a second display electrode of the second touch-sensitive display based on a second signal from the second display electrode. A two-dimensional position of the stylus touch input is determined relative to the second touch-sensitive display based at least on the second signal and noise compensation derived from the first signal.

20 Claims, 8 Drawing Sheets

```
┌─────────────────────────────────────────────────────────┐
│   DETECT A NON-STYLUS TOUCH INPUT AT A FIRST DISPLAY    │
│ ELECTRODE OF A FIRST TOUCH-SENSITIVE DISPLAY BASED ON A │
│    FIRST SIGNAL FROM THE FIRST DISPLAY ELECTRODE        │
│                                                     202 │
└─────────────────────────────────────────────────────────┘
                             │
                             ▼
┌─────────────────────────────────────────────────────────┐
│     DETECT A STYLUS TOUCH INPUT AT A SECOND DISPLAY     │
│ ELECTRODE OF A SECOND TOUCH-SENSITIVE DISPLAY BASED ON  │
│    A SECOND SIGNAL FROM THE SECOND DISPLAY ELECTRODE    │
│                                                     204 │
└─────────────────────────────────────────────────────────┘
                             │
                             ▼
┌─────────────────────────────────────────────────────────┐
│  DETERMINE A TWO-DIMENSIONAL POSITION OF THE STYLUS     │
│ TOUCH INPUT BASED AT LEAST ON THE FISRT SIGNAL AND NOISE│
│    COMPENSATION DERIVED FROM THE SECOND SIGNAL          │
│                                                     206 │
└─────────────────────────────────────────────────────────┘
```

NOISE COMPENSATION FOR TOUCH-SENSITIVE DISPLAY DEVICE

BACKGROUND

Touch-sensitive display devices may detect touch input when a suitable input object contacts a surface of a touch-sensitive display. A touch input may be interpreted by the touch-sensitive display device as a user input at a particular two-dimensional position on the surface of the display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A touch-sensitive display device includes a first touch-sensitive display including a first plurality of display electrodes configured to detect proximity of input objects to the first touch-sensitive display, and a second touch-sensitive display including a second plurality of display electrodes configured to detect proximity of input objects to the second touch-sensitive display. A touch controller detects a non-stylus touch input at a first display electrode of the first touch-sensitive display based on a first signal from the first display electrode, and a stylus touch input from a stylus at a second display electrode of the second touch-sensitive display based on a second signal from the second display electrode. A two-dimensional position of the stylus touch input is determined relative to the second touch-sensitive display based at least on the second signal and noise compensation derived from the first signal.

DETAILED DESCRIPTION

A touch-sensitive display device may detect a touch input caused by proximity of a suitable input object to the surface of one or more touch-sensitive displays. As used herein, "touch input" refers to any input detected by a touch-sensitive display device caused by proximity or contact of an input object with the surface of a touch-sensitive display. Non-limiting examples of suitable input objects include human fingers, other portions of a human hand, styli (including active and passive styli), and suitable control devices (e.g., a dial control that affixes to the surface of the display).

Figure 1:
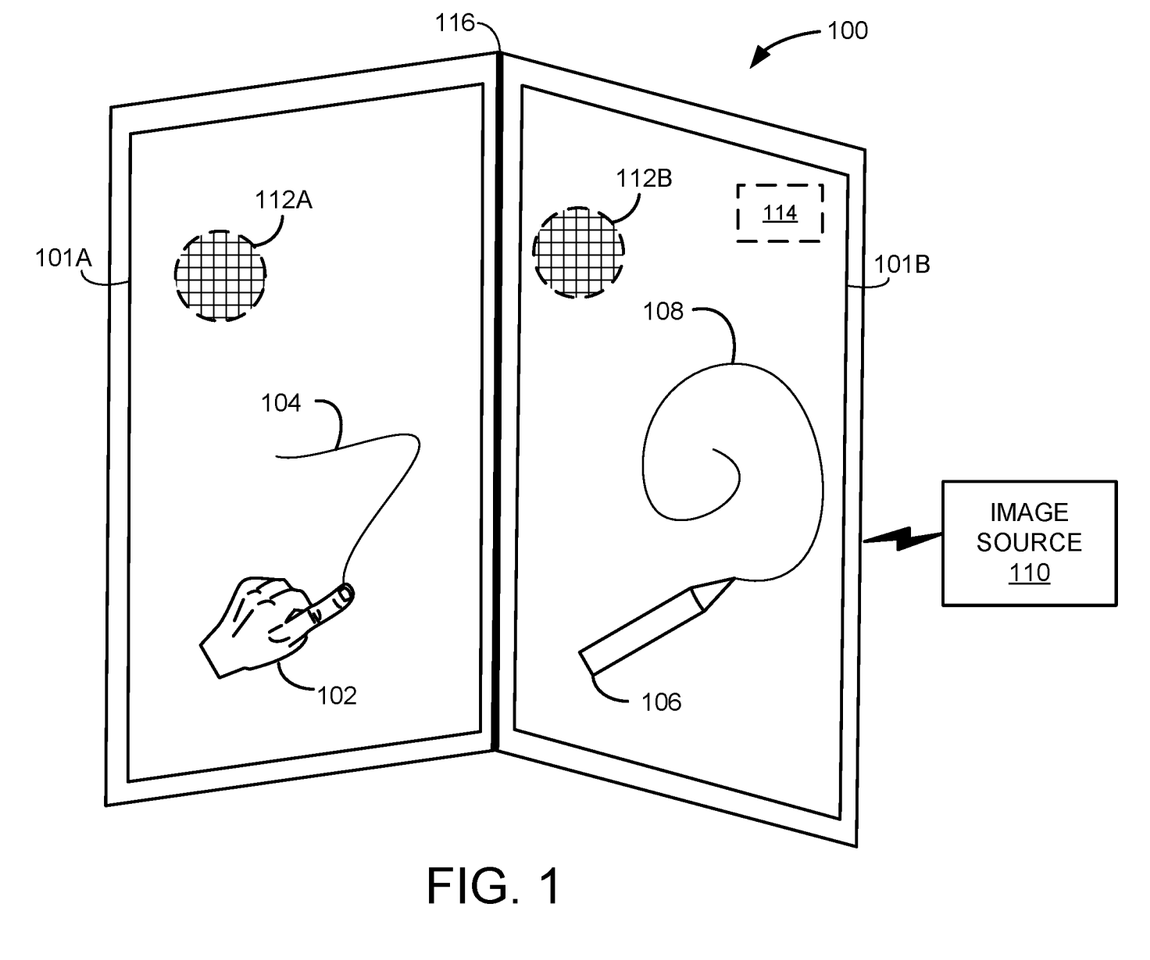
FIG. 1 schematically shows an example touch-sensitive display device.

This is schematically illustrated in FIG. 1, which shows an example touch-sensitive display device 100 including two touch-sensitive displays 101A and 101B. The touch-sensitive displays 101A/101B individually may have any suitable size(s) and dimension(s). In this example, the touch-sensitive display device includes two touch-sensitive displays, although this is not limiting. In other examples, a touch-sensitive display device may have a single touch-sensitive display or more than two touch-sensitive displays. In cases where the touch-sensitive display device includes two or more touch-sensitive displays, each display need not have the same size, shape, or resolution.

In some cases, a touch-sensitive display device may share a common housing with suitable computer hardware—e.g., such as in a mobile phone or tablet computer. In other examples, however, the touch-sensitive display device may be a standalone peripheral display (e.g., a monitor or television) configured to present content received from a separate device or source via a suitable wired or wireless connection. In any case, a touch-sensitive display device may have any suitable form factor and hardware configuration. A touch-sensitive display device may be implemented as computing system 900 described below with respect to FIG. 9.

In FIG. 1, a finger of a human hand 102 is contacting a surface of touch-sensitive display 101A, causing the touch-sensitive display device 100 to detect a touch input at the current two-dimensional position of the finger. The path of this touch input is represented by line 104 on the surface of the display, where the shape of the line reflects movement of the finger across the surface of the display prior to the depicted point in time. Similarly, a stylus 106 is also contacting the surface of display 101B, causing the touch-sensitive display device to detect a touch input at the current two-dimensional position of the stylus. Once again, a line 108 is used to represent a prior movement of the stylus across the surface of the display.

Touch-sensitive display device 100 optionally may present image content on either or both of displays 101A and 101B. Such image content may be received from an image source 110, which may take any suitable form. For example, the image source may include a computing device external to, or housed within, the display device 100. In FIG. 1, touch input detected by the touch-sensitive display device is graphically represented on the touch-sensitive displays (i.e., as lines 104 and 108). It will be understood, however, that this need not be the case. Rather, touch input may be used to manipulate content presented on the touch-sensitive displays, or otherwise control the touch-sensitive display device, without any representation of the touch input itself being rendered for display.

The touch-sensitive displays may detect proximity of input objects in any suitable way, utilizing any suitable touch-sensing and/or hover-sensing technologies. For example, each touch-sensitive display may use a suitable capacitive touch sensor—e.g., relying on mutual capacitance or self-capacitance—although non-capacitive technologies may alternatively be used. In FIG. 1, the first touch-sensitive display 112A includes a first plurality of display electrodes 112A configured to detect proximity of input objects to the first touch-sensitive display. Similarly, the second touch-sensitive display 112B includes a second plurality of display electrodes 112B configured to detect proximity of input objects to the second touch-sensitive display. The display electrodes may, for example, detect a change in capacitance caused by proximity of an input object to a display surface, and/or detect touch inputs in other suitable ways. By monitoring electrical conditions at the plurality of display electrodes, a touch controller 114 may determine the two-dimensional positions of any touch inputs relative to the surfaces of the touch-sensitive displays. The display electrodes and touch controller are shown with dashed lines to indicate that they are disposed beneath the display surface. The electrodes may have any suitable resolution(s) and/or coverage area (e.g., 100% coverage across all display area or less than 100% coverage).

The touch controller may take the form of any suitable computer logic or processing componentry. In some examples, the touch controller may take the form of logic subsystem 902 described below with respect to FIG. 9.

In cases where the touch-sensitive display device includes two or more touch-sensitive displays, as in FIG. 1, the two or more touch-sensitive displays may have any static or dynamic spatial and/or angular relationships with respect to one another. For example, in FIG. 1, touch-sensitive display device 100 further comprises a hinge 116 disposed between the first touch-sensitive display 101A and the second touch-sensitive display 101B. In this manner, an angular relationship between the first and second touch-sensitive displays may be dynamically adjusted.

Hinge 116 may have any suitable range of motion. For instance, hinge 116 may enable touch-sensitive display device 100 to be folded in half, such that the surfaces of the two displays are parallel and facing toward one another (i.e., ~0° angle between the two displays). Similarly, the hinge may enable the device to be opened to a flat "tablet" configuration where the surfaces of the touch-sensitive displays are substantially coplanar (i.e., ~180° angle between the two displays). The present disclosure primarily focuses on this flat configuration. In general, however, two touch-sensitive displays may have any angular relationship with respect to one another, ranging between a minimum angular difference (e.g., 0°) and a maximum angular difference (e.g., 180° or 360°) supported by the hinge. Furthermore, a touch-sensitive display device may have any number of hinges, each having any suitable range of motion. Multiple hinges may, for example, enable rotation of one or more displays (and/or other portions of the device) about any rotational axes.

The present disclosure describes touch input as being detected by the touch-sensitive display device in response to "proximity" of input objects to the surface of the touch-sensitive display. This may include situations in which the input objects directly contact the surface of the touch-sensitive display. In some cases, touch input may additionally be detected when the input objects hover in close proximity to the surface of the display—e.g., within a few centimeters—without directly contacting the display surface.

Regardless, the touch-sensitive display device may be configured to respond to touch inputs in a variety of suitable ways. In this manner, a user may control the touch-sensitive display device by intentionally brining input objects into proximity with the touch-sensitive display. However, accurate and consistent detection of touch inputs may be compromised by various sources of electrical noise that may affect performance of the touch-sensitive display device. Such electrical noise may in some cases be caused by a difference in electrical grounding between the touch-sensitive display device and a user, as will be described in more detail below.

Accordingly, the present disclosure is directed to techniques for touch input detection for a touch-sensitive display device. Specifically, the present disclosure focuses on detecting a stylus touch input on one touch-sensitive display of a touch-sensitive display device, while accounting for electrical noise via a noise-compensation derived from a non-stylus touch input detected at a different touch-sensitive display. This takes advantage of the physical and electrical separation between the touch-sensitive displays. In other words, it may be relatively difficult to derive noise compensation from display electrodes on the same touch-sensitive display that detects the stylus touch input, because it can be difficult to parse the relative extents to which the stylus and electrical noise both contribute to signals reported by those electrodes. Instead, by deriving the noise compensation from signals reported by display electrodes on a separate display, such electrodes may effectively be used as a reference to characterize the electrical noise in the absence of any stylus input. Once the electrical noise is characterized, it may be more easily accounted for when detecting stylus touch inputs on the other display. In this manner, stylus touch inputs may be more accurately resolved to two-dimensional positions relative to the surface of a touch-sensitive display, even in situations in which accurate input detection would otherwise be compromised by electrical noise.

Figure 2:
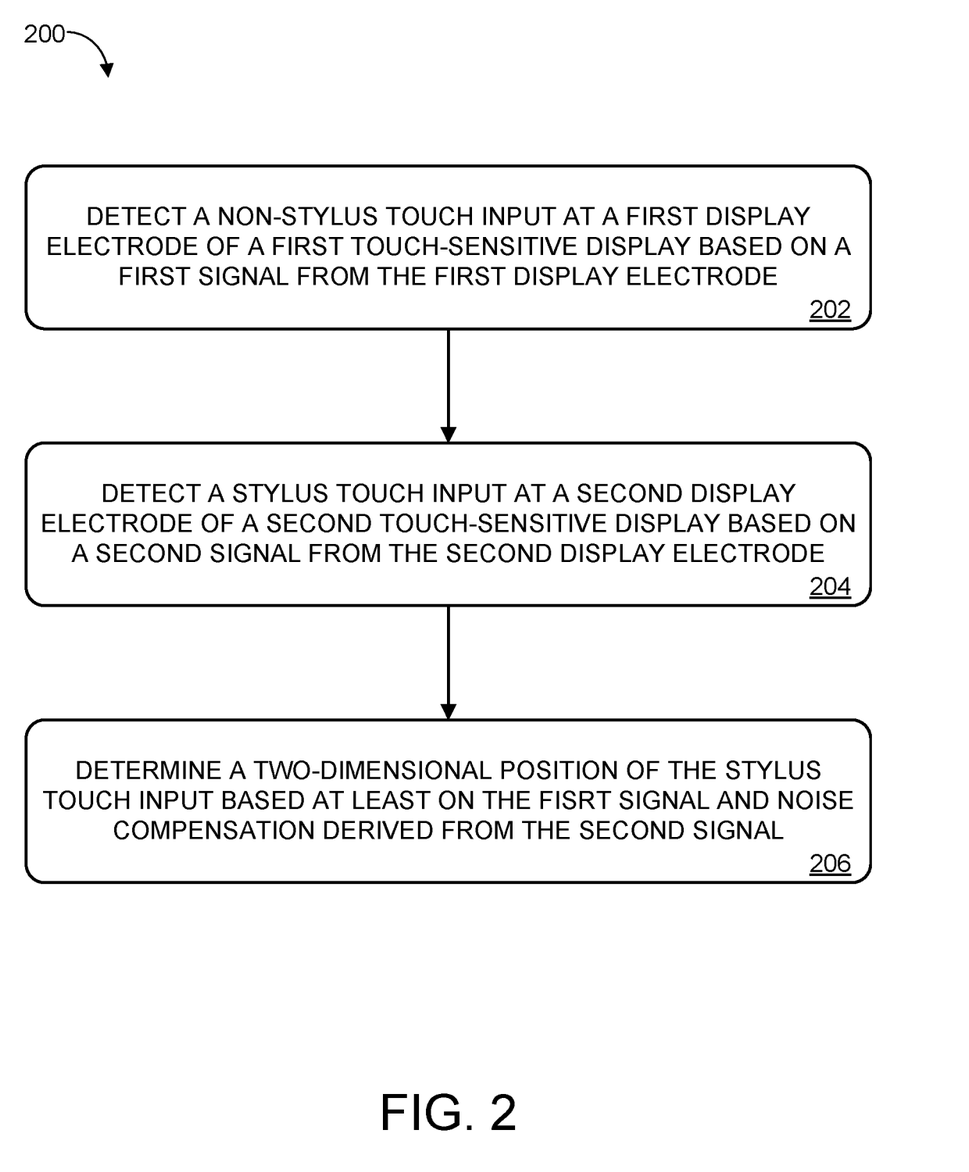
FIG. 2 illustrates an example method for touch input detection for a touch-sensitive display device.

FIG. 2 illustrates an example method 200 for touch input detection on a touch-sensitive display device. Method 200 may be implemented by any suitable touch-sensitive display device, having any suitable hardware configuration and form factor. Steps of method 200 may in some cases be performed by a touch controller, such as touch controller 114 described above with respect to FIG. 1. In some cases, method 200 may be implemented by computing system 900 described below with respect to FIG. 9.

At 202, method 200 includes detecting a non-stylus touch input at a first display electrode of a first touch-sensitive display based on a first signal from the first display electrode. The specific manner in which the non-stylus touch input is detected will depend on the specific type of touch technology used in the first touch-sensitive display, and the techniques disclosed herein may be applied to any suitable touch sensing technology. As discussed above, each touch-sensitive display of a touch-sensitive display device may include a plurality of display electrodes disposed beneath the surface of the touch-sensitive display. Proximity of an input object to the surface of the display may influence electrical conditions (e.g., capacitance) at one or more of the plurality of display electrodes, and this change in electrical conditions may be reported to the touch controller. Thus, each individual display electrode (including the "first" display electrode) may report signals to the touch controller, such signals representing electrical conditions detected by the display electrodes. The positions of touch inputs relative to the surface of the display may then be determined based on the changes in electrical conditions reported by the various display electrodes.

At 204, method 200 includes detecting a stylus touch input from a stylus at a second display electrode of the second touch-sensitive display based on a second signal from the second display electrode. As used herein, "detecting a stylus touch input" includes detecting electrical conditions that are caused at least in part by proximity of a stylus to a surface of a touch-sensitive display, even if such electrical conditions are also caused at least in part by a non-stylus input.

Again, the specific manner in which the stylus touch input is detected will depend on the specific type of touch technology used in the second touch-sensitive display, and the techniques disclosed herein may be applied to any suitable touch sensing technology. However, with specific regard to stylus input, the stylus may in some cases be an active stylus that includes one or more stylus electrodes that may be actively driven to emit an electrical signal having a known frequency. Thus, detecting stylus touch input from a stylus may in some cases include receiving signals from display electrodes that detect electrical signals having this known frequency. For instance, a signal reported by a "second" display electrode on the second touch-sensitive display may include a frequency component corresponding to the known frequency of the stylus signal. By evaluating the relative magnitude of the signal reported by the second display electrode with respect to the known stylus frequency, the proximity of the display electrode to the stylus may be inferred.

Figure 3A:
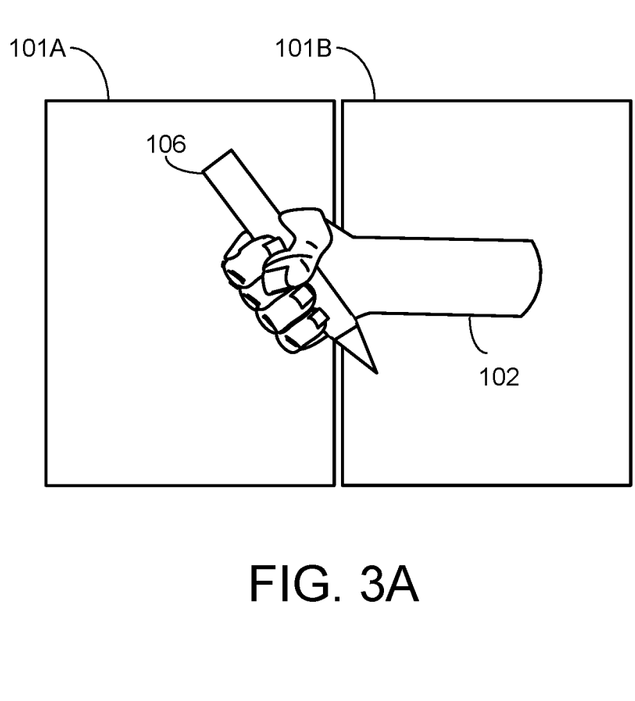
FIGS. 3A and 3B schematically illustrate detection of touch inputs on a touch-sensitive display device.
Figure 3B:
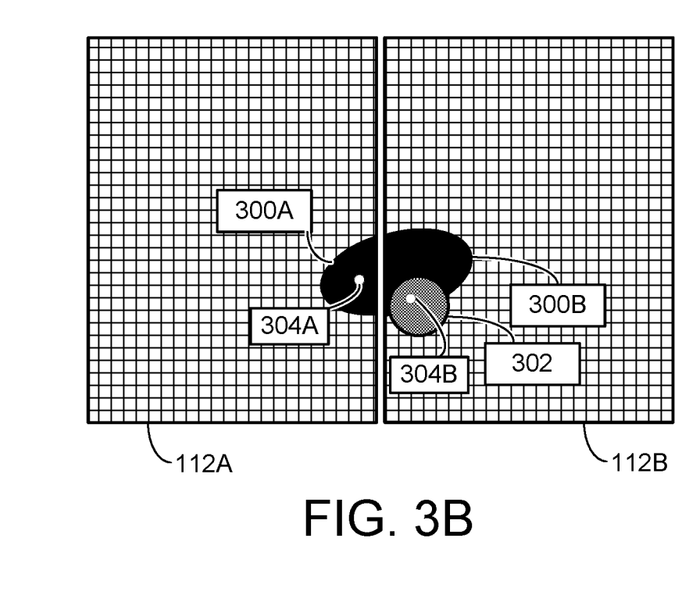

Touch input detection on a touch-sensitive display device is schematically illustrated with respect to FIGS. 3A and 3B. FIG. 3A again shows touch-sensitive displays 101A and 101B, though the rest of touch-sensitive display device 100 (including hinge 116) is omitted. Furthermore, the two touch-sensitive displays are depicted as being in a coplanar configuration, in which the surfaces of the touch-sensitive displays are substantially parallel and lie on substantially the same plane. It will be understood, however, that the angular relationship between the two touch-sensitive displays may in some cases be dynamically adjustable, and that the herein-described techniques may be applied in situations where the angular relationship between the two displays is different.

In FIG. 3A, touch-sensitive display 101A is detecting a non-stylus touch input corresponding to contact between the first touch-sensitive display and the hand 102 of the user of the touch-sensitive display device. Touch-sensitive display 101B is detecting a stylus touch input corresponding to contact between a tip of stylus 106 and the surface of the display. Touch-sensitive display 101B is also detecting a non-stylus touch input corresponding to contact between hand 102 and the display surface. It will be understood that, in other examples, non-stylus touch inputs may be detected from other input objects and need not specifically correspond to a user hand.

FIG. 3B schematically represents the respective pluralities of display electrodes 112A and 112B disposed beneath the surfaces of touch-sensitive displays 101A and 101B. The shaded regions 300A/B and 302 shown over the pluralities of display electrodes represent positions at which the touch-sensitive display device is currently detecting touch inputs. Specifically, region 300A corresponds to a non-stylus touch input detected by the first touch-sensitive display, while region 300B corresponds to a non-stylus touch input detected by the second touch-sensitive display. Region 302 corresponds to the stylus touch input detected by second touch-sensitive display 101B. FIG. 3B is therefore analogous to a "heat map" showing the distribution of touch inputs across the two touch-sensitive displays at a given time. In this example, regions 300B and 302 corresponding to non-stylus and stylus touch inputs are clearly delineated. This is done only for the sake of visual clarity. In practical applications, the touch controller may receive a superposition of regions 300B and 302, making it difficult to resolve the stylus touch input to any particular two-dimensional position. For the purposes of this disclosure, "detecting a stylus touch input" includes receiving a superposition of stylus and non-stylus touch inputs on the same touch-sensitive display.

FIG. 3B also schematically represents a first display electrode 304A, which is among the display electrodes detecting non-stylus touch input 300A. A second display electrode 304B is among the display electrodes detecting both non-stylus touch input 300B and stylus touch input 302. It will be understood that the positions of the first and second display electrodes within FIG. 3B are not limiting. Instead, for the purposes of this disclosure, a "first" display electrode may be any display electrode on a first touch-sensitive display that detects a non-stylus touch input. Similarly, a "second" display electrode may be any display electrode on a second touch-sensitive display that detects a stylus touch input. As discussed above, when the first display electrode and second display electrode are on opposite displays, noise compensation may be improved because the stylus typically only provides input to one of the displays, thus allowing more accurate noise calculations on the other display. For example, when touch input is detected on the second display device, it may be difficult to identify display electrodes on the second display device that are affected by electrical noise and not the stylus touch input. When the first and second display electrodes are on different touch-sensitive displays, the first display electrode may be used as a reference for characterizing and compensating for noise affecting the second display electrode, as will be discussed in more detail above.

Electrical noise affecting a display electrode may originate from any of a variety of sources. In some cases, the electrical noise may be caused by a difference in electrical grounding between the touch-sensitive display device and a user of the touch-sensitive display device. This may occur when the touch-sensitive display device uses an electrical power supply that is not grounded to "earth" ground. For example, the touch-sensitive display device may draw power from a wall socket using a cable that lacks a grounding prong (e.g., the cable uses a "two-prong" plug rather than a "three-prong" plug). Because the user of the touch-sensitive display device is grounded to "earth" ground, the user's grounding will differ from the electrical ground used by the display device. In this case, electrical noise may be introduced by the electrical power supply of the device at any time when there is direct contact between a display surface and the user's body.

In general, similar electrical noise may arise in any situation in which the electrical grounding of the touch-sensitive display device effectively differs from the electrical grounding of the user. In another example, the touch-sensitive display device may be powered by an internal battery that is grounded to a metal device chassis, rather than "earth" ground. If a user is contacting the surface of one or more touch-sensitive displays without contacting the metal device chassis (e.g., the device is resting on a table, rather than being held by the user), then there will again be a difference in electrical grounding between the user and the device. In this case, electrical noise may be introduced by the stylus through the user's body any time the stylus and user's body are both contacting a display surface.

Figure 4:
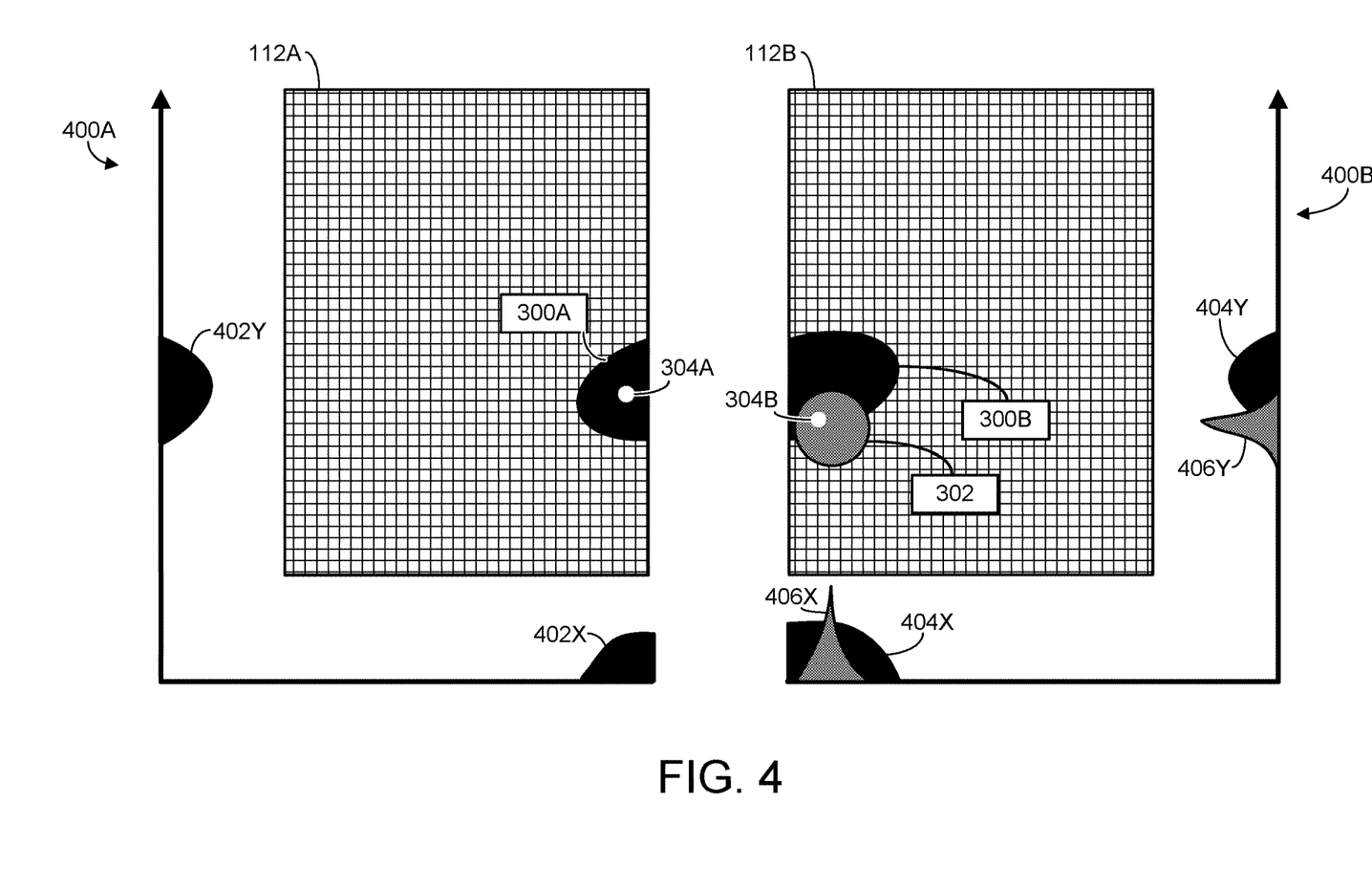
FIG. 4 schematically illustrates detection of stylus and non-stylus touch inputs on first and second touch-sensitive displays of a touch-sensitive display device.

FIG. 4 schematically illustrates detection of stylus and non-stylus touch inputs on first and second touch-sensitive displays of a touch-sensitive display device. Specifically, FIG. 4 again schematically depicts the respective first and second pluralities 112A and 112B of display electrodes, including first display electrode 304A and second display electrode 304B. The relative positions of the stylus and non-stylus touch inputs are again given by regions 300A/300B and 302.

FIG. 4 also includes plots 400A and 400B representing signals reported to touch controller 114 by the respective pluralities of display electrodes of the first and second touch-sensitive displays. Specifically, signals reported by individual display electrodes 112A of the first touch-sensitive display, including first display electrode 304A, are aggregated on a row-by-row basis to give region 402Y on plot 400A. Region 402X is given by aggregation of signals reported by the same display electrodes on a column-by-column basis. Thus, both regions 402Y and 402X are different representations of non-stylus touch input 300A. Notably, however, at least some of the signals reported by display electrodes 112A may correspond to electrical noise, as discussed above.

With respect to stylus touch input 302, such electrical noise can interfere with the ability of the touch-sensitive display device to accurately resolve the stylus touch input to a particular two-dimensional position. As shown, regions 404X and 404Y collectively represent non-stylus touch input 300B, just as regions 402X and 402Y collectively represent non-stylus touch input 300A. Similarly, regions 406X and 406Y collectively represent stylus touch input 302 on touch-sensitive display 101B. Second display electrode 304B is positioned within the overlap between stylus touch input 302 and non-stylus touch input 300B, and thus signals from second display electrode 304B contribute to regions 404X/Y and 406X/Y.

Regions 406X and 406Y each overlap at least partially with regions 404X and 404Y. While such overlap is apparent in FIG. 4 due to the different shadings used for regions 404X/Y and 406X/Y, this is done as a visual aid only. In practical scenarios, such overlap may be more difficult for the touch controller to distinguish. Rather, in some scenarios, the touch controller may receive a superposition of regions 404X/Y and 406X/Y. In other words, there may be no distinction, on an electrode-by-electrode level, what proportion of any detected electrical conditions are caused by stylus touch input as compared to non-stylus touch input. Especially because, as discussed above, at least some of the signals contributing to regions 404X and 404Y may represent electrical noise. In other words, electrical conditions at display electrodes of the second display device may be affected both by the stylus touch input and the electrical noise, and it can be difficult to determine which has a greater effect on any particular electrode. All of this can interfere with the ability of the touch-sensitive display device to accurately resolve stylus touch input 302 to a particular two-dimensional position.

By contrast, display electrodes 112A are somewhat isolated from display electrodes 112B, due to the separation between the two touch-sensitive displays. Thus, while regions 402X and 402Y are affected by electrical noise caused by the non-stylus touch input, these regions are not affected by the stylus touch input. Signals reported by display electrodes contributing to regions 402X/Y (e.g., first display electrode 304A) may be used to characterize the electrical noise, and apply noise-correction to display electrodes on the other display device (e.g., second display electrode 304B), as will be described in more detail below.

Returning briefly to FIG. 2, at 206, method 200 includes determining a two-dimensional position of the stylus touch input based at least on the first signal, as reported by the first display electrode, and noise compensation derived from the second signal, as reported by the second display electrode. This is schematically illustrated with respect to FIG. 5. As shown, first display electrode 304A reports a first signal 500A to touch controller 114. Similarly, second display electrode 304B reports a second signal 500B to touch controller 114.

Figure 5:
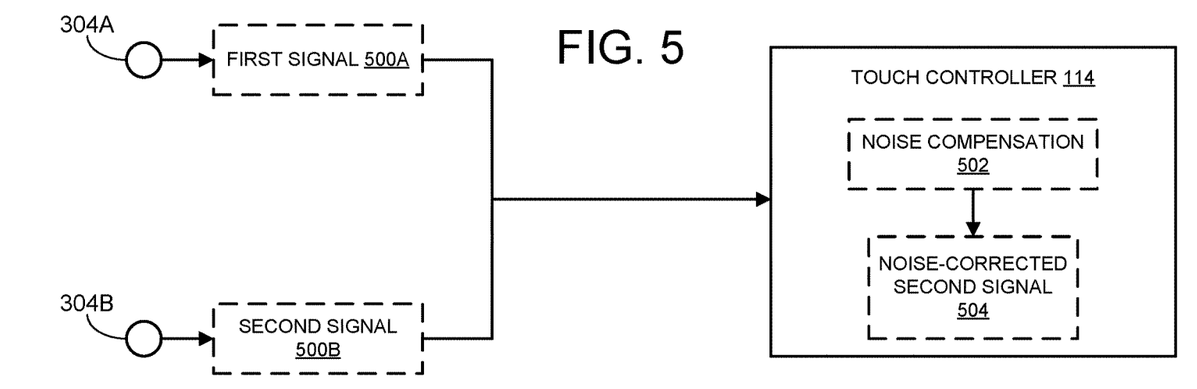
FIG. 5 schematically illustrates an example touch controller receiving first and second signals from first and second display electrodes.

The first and second signals may each take any suitable forms. Typically, the first and second signals will be representations of electrical conditions (e.g., capacitance changes) detected by the first and second display electrodes and caused by proximity of input objects to the electrodes. The electrical conditions may be, for example, represented as time-domain waveforms, although other suitable representations may instead be used.

After receiving the first and second signals, the touch controller derives a noise compensation 502 from the second signal 500B. More details with respect to the noise compensation will be provided below with respect to FIGS. 6 and 7. In many cases, the noise compensation may include modifying the second signal in a way that mitigates or removes any electrical noise affecting the second display electrode, and therefore contributing to the second signal. For example, as will be described in more detail below, the touch controller may be configured to subtract an identified electrical noise from the second signal. This may result in a noise-corrected second signal 504, from which the two-dimensional position of the stylus touch input may be more accurately determined.

The noise compensation derived by the touch controller may take any variety of suitable forms. In general, the touch controller may be configured to computer-analyze the first signal to identify an electrical noise affecting the first display electrode. Based on the identified electrical noise, the touch controller may determine a noise-corrected second signal from the second signal and determine the two-dimensional position of the stylus touch input from the noise-corrected second signal. Although the present disclosure primarily focuses on deriving noise compensation from a singular "second signal," it will be understood that "noise compensation" as described herein may be derived from any number of signals received from any number of display electrodes. Thus, any number of signals may be modified to produce "noise-corrected" signals, from which the positions of one or more stylus touch inputs may be more accurately determined.

In some cases, deriving a noise compensation from a second signal may include comparing relative magnitudes of the first and second signals with respect to different frequency components. As discussed above, the first and second signals may in some cases be represented as time-domain waveforms. Such waveforms may be expressed in terms of discrete frequency components contributing to the waveforms, where different frequency components have different magnitudes with respect to the larger signal. For example, the touch controller may apply a suitable frequency-domain transformation to the first and second signals to determine the relative magnitudes of individual frequency components contributing to the signals.

Furthermore, as discussed above, the stylus may in some cases be an active stylus that emits an electrical signal having a known frequency, referred to herein as a "first frequency." Thus, the relative magnitudes of the first and second signals with respect to the first frequency may be used to infer the relative proximities of the first and second display electrodes to the stylus. However, any electrical noise affecting the touch-sensitive display device may cause detection of a plurality of frequencies by the first and second display electrodes, including the first frequency. As such, just because a particular signal has a relatively high magnitude with respect to the first frequency does not necessarily mean that a corresponding display electrode is in relatively close proximity to the stylus. Rather, the magnitude of that signal with respect to the first frequency may instead partially or entirely correspond to electrical noise.

This is schematically illustrated with respect to FIG. 6, which again shows first signal 500A and second signal 500B. In this case, the first and second signals are represented as including two frequency components F1 and F2 having different magnitudes, where F1 corresponds to the "first" frequency emitted by the stylus. As discussed above, the electrical noise may cause detection of a plurality of frequencies, and this plurality may include a "second" frequency F2 that differs from the first frequency. Because the second frequency is different from the known frequency emitted by the stylus, the second frequency may advantageously be used as an indicator that a particular signal reported by a display electrode is likely affected by electrical noise.

The second frequency may be any suitable frequency that is consistently detected by display electrodes affected by electrical noise. The specific values of such frequencies will typically depend both on the source of the electrical noise (e.g., introduced by the device's power supply or the stylus), as well as the specific type of touch-sensing technology used. In some cases, the second frequency may advantageously have a value that is relatively similar to the first frequency—e.g., +/−5%. This may make it relatively more likely that electrical noise will cause detection of first and second frequency components by display electrodes with a substantially fixed ratio, as will be described in more detail below.

Figure 6:
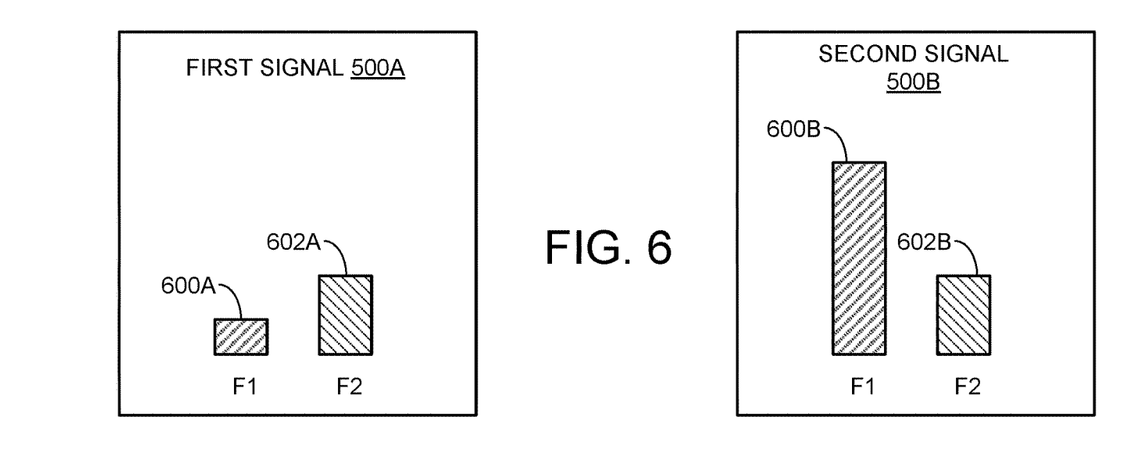
FIG. 6 schematically depicts first and second signals detected by first and second display electrodes.

In FIG. 6, the first signal 500A and second signal 500B both include frequency components corresponding to the first and second frequencies. Because the second signal corresponds at least partially to the stylus touch input, the second signal has a relatively higher magnitude with respect to the first frequency as compared to the first signal, which is only detecting non-stylus touch input. However, the first signal does still include a frequency component corresponding to the first frequency, which likely corresponds to electrical noise. Furthermore, in this example, each of the first and second signals have approximately the same magnitude at the second frequency. This is done for the sake of simplicity and will typically not be the case in practical scenarios.

By comparing the relative magnitudes of the first and second signals at the first and second frequencies, the touch controller may estimate a proportion of the magnitude of the second signal at the first frequency that corresponds to the electrical noise. This may be done based on the assumption that the ratio between the magnitudes of certain frequency components caused by electrical noise will remain relatively fixed for any display electrodes affected by the electrical noise. In other words, electrical noise may affect different display electrodes to different degrees, and yet will contribute to first and second frequency components of affected signals at substantially the same ratio. Or, for frequency components of a first signal $S_1$ and a second signal $S_2$ specifically caused by electrical noise:

$$S_1(F2:F1)=S_2(F2:F1)$$

Accordingly, the touch controller may be configured to identify a ratio between the magnitude of the first signal at the first frequency and the magnitude of the first signal at the second frequency. Based on this identified ratio and a magnitude of the second signal at the second frequency, the proportion of the magnitude of the second signal at the first frequency corresponding to the electrical noise may be estimated.

Figure 7:
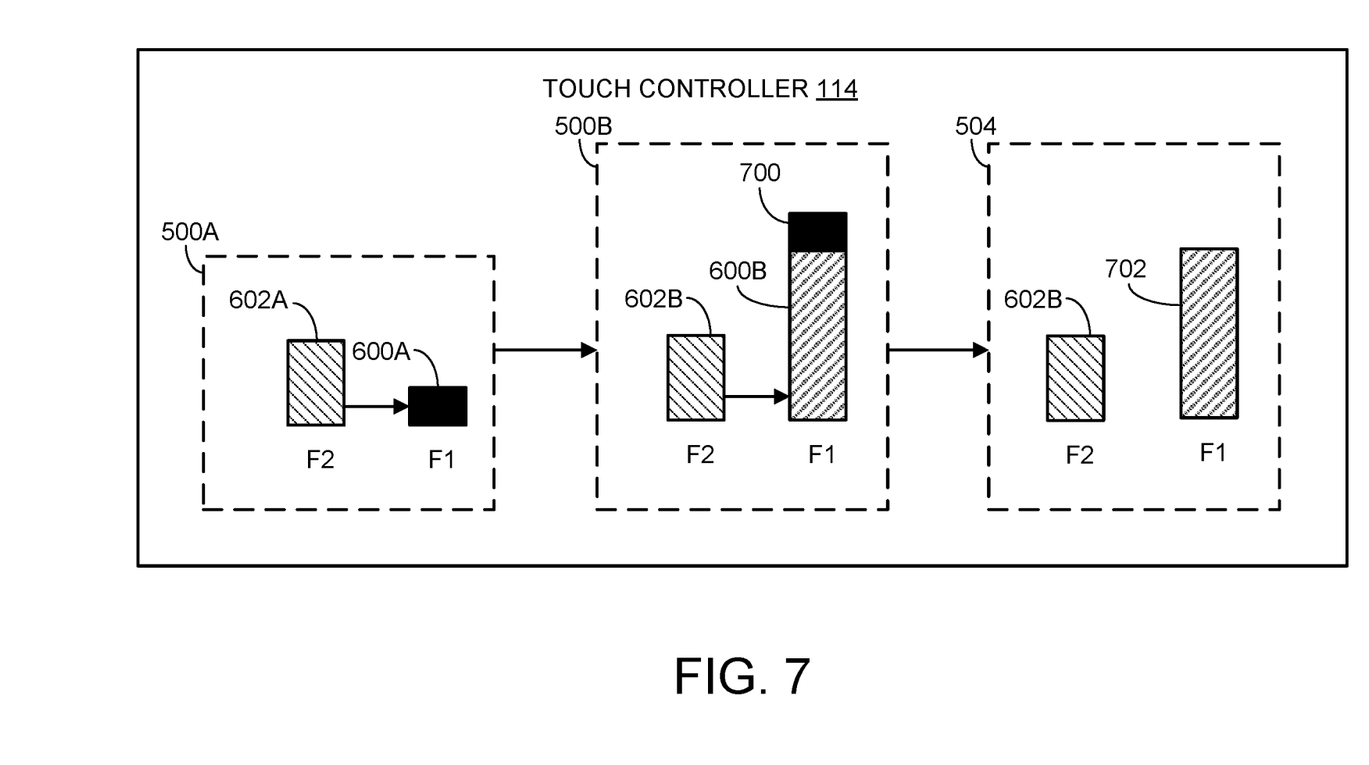
FIG. 7 schematically illustrates noise compensation derived from a signal detected by a display electrode.

This is schematically illustrated with respect to FIG. 7, which depicts computer-analysis of first and second signals 500A/B by touch controller 114. As shown, within first signal 500A, the magnitude of frequency component F2 has a certain ratio with the magnitude of frequency component F1. In this example, the F2:F1 ratio is approximately 2:1. By applying this same ratio to second signal 500B, the touch controller may identify a proportion 700 of the magnitude of the second signal at the first frequency that is predicted to correspond to electrical noise. The touch controller may then modify the second signal to remove or otherwise mitigate the impact of the identified electrical noise, thereby more accurately determining the two-dimensional position of the stylus touch input. In this example, the first and second signals have approximately the same magnitude with respect to the second frequency. Thus, proportion 700 is approximately equal to the total magnitude of the first signal at the first frequency. However, in scenarios where the first and second signals have different magnitudes with respect to the second frequency, the size of the identified proportion may be determined to be greater or lesser than the magnitude of the first signal at the first frequency.

In FIG. 7, once proportion 700 is identified as corresponding to electrical noise, the touch controller subtracts the electrical noise from the second signal to give noise-corrected second signal 504. However, it will be understood that noise-corrected signals may be generated in any suitable way using any suitable operations, and that subtraction is only one example. Furthermore, in FIG. 7, noise-corrected second signal 504 still has substantially the same magnitude at the second frequency. In other examples, however, generating the noise-corrected second signal may include removing any frequency components other than the first frequency.

Figure 8:
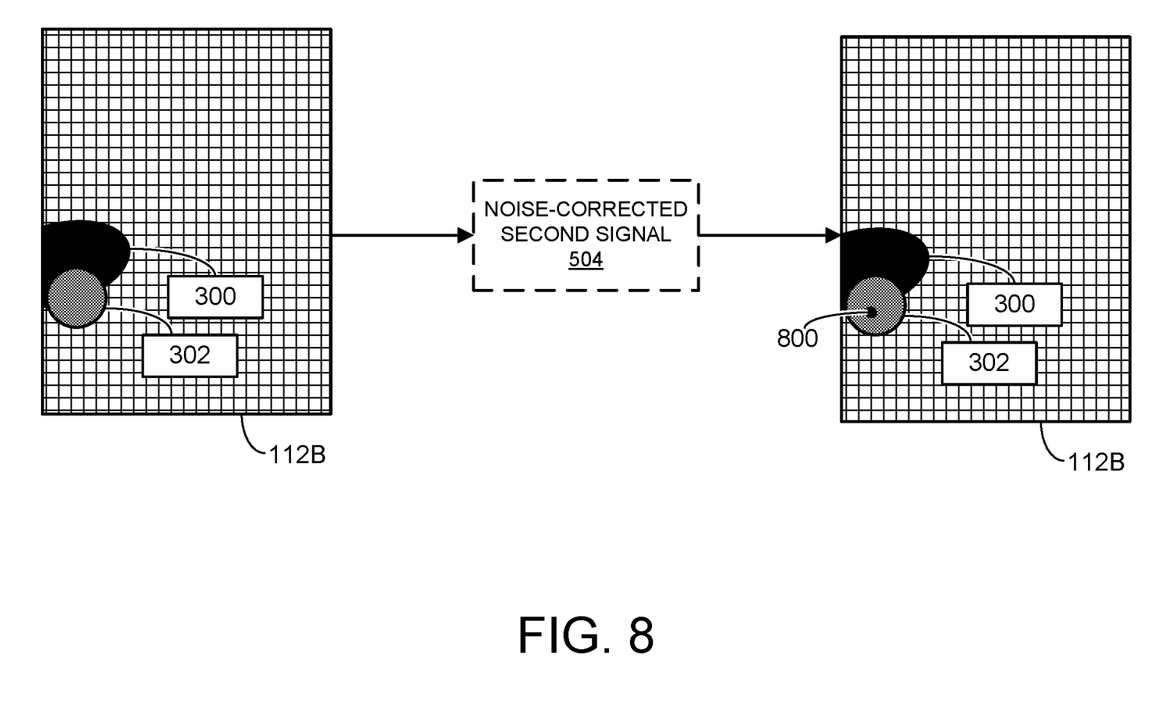
FIG. 8 schematically illustrates determining a two-dimensional position of a stylus touch input relative to a touch-sensitive display.

After determining the noise-corrected second signal, the touch controller may determine the two-dimensional position of the stylus touch input based on the noise-corrected second signal. This is schematically illustrated with respect to FIG. 8, which again shows the second plurality of display electrodes 112B of second touch-sensitive display 101B. FIG. 8 additionally shows regions 300 and 302 corresponding to the non-stylus and stylus touch inputs detected at the second touch-sensitive display. Based on the noise-corrected second signal 504, the touch controller determines a two-dimensional position 800 of the stylus touch input relative to touch-sensitive display 101B. The specific manner in which the two-dimensional position of the stylus touch input is determined from the noise-corrected second signal will again depend based on the specific type of touch sensing technology used.

As discussed above, the two-dimensional position of the stylus touch input need not be determined based on only one noise-corrected signal from only one display electrode. Rather, in a typical case, any number of signals received from any number of display electrodes may be noise-corrected and used to determine the two-dimensional position of the stylus touch input.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
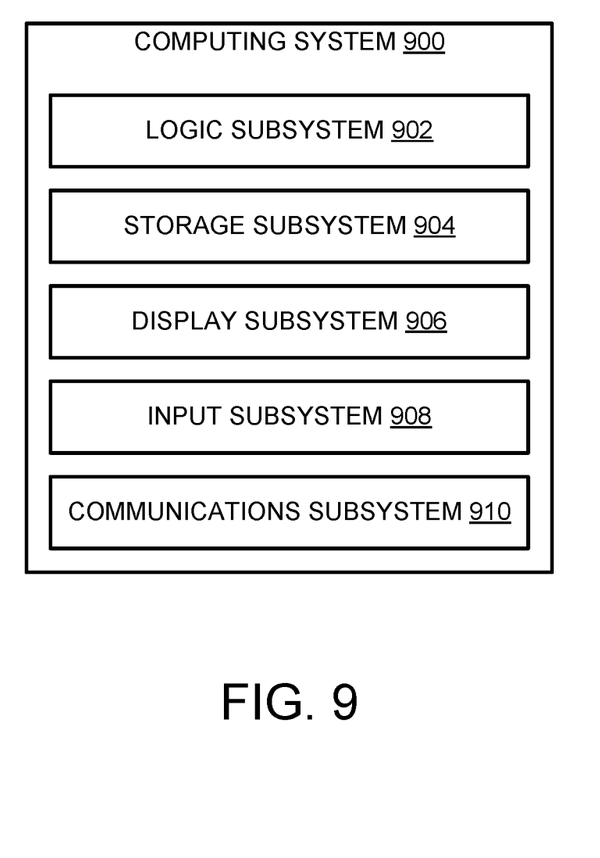
FIG. 9 schematically shows an example computing system.

FIG. 9 schematically shows a simplified representation of a computing system 900 configured to provide any to all of the compute functionality described herein. Computing system 900 may take the form of one or more touch-sensitive display devices (e.g., touch-sensitive display device 100), personal computers, tablet computers, home-entertainment computers, gaming devices, mobile computing devices, mobile communication devices (e.g., smart phone), wearable computing devices, Internet of Things (IoT) devices, embedded computing devices, and/or other computing devices.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays. In some cases, the display subsystem may include one or more touch-sensitive displays, as discussed above (e.g., touch-sensitive displays 101A and 101B).

When included, input subsystem 908 may comprise or interface with one or more input devices. An input device may include a sensor device or a user input device. Examples of user input devices include a keyboard, mouse, display electrodes of one or more touch-sensitive displays, or a game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a touch-sensitive display device comprises: a first touch-sensitive display including a first plurality of display electrodes configured to detect proximity of input objects to the first touch-sensitive display; a second touch-sensitive display including a second plurality of display electrodes configured to detect proximity of input objects to the second touch-sensitive display; and a touch controller configured to: detect a non-stylus touch input at a first display electrode of the first touch-sensitive display based on a first signal from the first display electrode; detect a stylus touch input from a stylus at a second display electrode of the second touch-sensitive display based on a second signal from the second display electrode; and determine a two-dimensional position of the stylus touch input relative to the second touch-sensitive display based at least on the second signal and noise compensation derived from the first signal. In this example or any other example, the touch controller is configured to computer-analyze the first signal to identify an electrical noise affecting the first display electrode, and based on the identified electrical noise, determine a noise-corrected second signal from the second signal, and where the two-dimensional position of the stylus touch input is determined based on the noise-corrected second signal. In this example or any other example, the touch controller is configured to subtract the identified electrical noise from the second signal to give the noise-corrected second signal. In this example or any other example, the stylus emits an electrical signal having a first frequency, the electrical noise causes detection of a plurality of frequencies by the first and second display electrodes including the first frequency and a second frequency, and the touch controller is configured to compare relative magnitudes of the first and second signals at the first and second frequencies to derive the noise compensation. In this example or any other example, the touch controller is configured to identify a ratio of a magnitude of the first signal at the first frequency to a magnitude of the first signal at the second frequency, and based on the identified ratio and a magnitude of the second signal at the second frequency, estimate a proportion of a magnitude of the second signal at the first frequency that corresponds to the electrical noise. In this example or any other example, the non-stylus touch input corresponds to contact between the first touch-sensitive display and a hand of a user of the touch-sensitive display device. In this example or any other example, determining the two-dimensional position of the stylus touch input based on the noise compensation includes compensating for an electrical noise caused by a difference in electrical grounding between the touch-sensitive display device and a user of the touch-sensitive display device. In this example or any other example, the electrical noise is introduced by an electrical power supply of the touch-sensitive display device. In this example or any other example, the electrical noise is introduced by the stylus. In this example or any other example, the stylus is an active stylus. In this example or any other example, the touch-sensitive display device further comprises a hinge disposed between and providing dynamic angular adjustment between the first touch-sensitive display and the second touch-sensitive display, where the hinge is configured to allow dynamic adjustment into a coplanar arrangement of the first and second touch-sensitive displays.

In an example, a method for touch input detection on a touch-sensitive display device comprises: detecting a non-stylus touch input at a first display electrode of a first touch-sensitive display of the touch-sensitive display device based on a first signal from the first display electrode, the first touch-sensitive display including a first plurality of display electrodes configured to detect proximity of input objects to the first touch-sensitive display; detecting a stylus touch input from a stylus at a second display electrode of a second touch-sensitive display of the touch-sensitive display device based on a second signal from the second display electrode, the second touch-sensitive display including a second plurality of display electrodes configured to detect proximity of input objects to the second touch-sensitive display; and determining a two-dimensional position of the stylus touch input relative to the second touch-sensitive display based at least on the second signal and noise compensation derived from the first signal. In this example or any other example, the method further comprises computer-analyzing the first signal to identify an electrical noise affecting the first display electrode, and based on the identified electrical noise, determining a noise-corrected second signal from the second signal, and where the two-dimensional position of the stylus touch input is determined based on the noise-corrected second signal. In this example or any other example, determining the noise-corrected second signal includes subtracting the identified electrical noise from the second signal. In this example or any other example, the stylus emits an electrical signal having a first frequency, the electrical noise causes detection of a plurality of frequencies by the first and second display electrodes including the first frequency and a second frequency, and the method further comprises comparing relative magnitudes of the first and second signals at the first and second frequencies to derive the noise compensation. In this example or any other example, the method further comprises identifying a ratio of a magnitude of the first signal at the first frequency to a magnitude of the first signal at the second frequency, and based on the identified ratio and a magnitude of the second signal at the second frequency, estimating a proportion of a magnitude of the second signal at the first frequency that corresponds to the electrical noise. In this example or any other example, the non-stylus touch input corresponds to contact between the first touch-sensitive display and a hand of a user of the touch-sensitive display device. In this example or any other example, determining the two-dimensional position of the stylus touch input based on the noise compensation includes compensating for an electrical noise caused by a difference in electrical grounding between the touch-sensitive display device and a user of the touch-sensitive display device. In this example or any other example, the electrical noise is introduced by an electrical power supply of the touch-sensitive display device.

In an example, a touch-sensitive display device comprises: a first touch-sensitive display including a first plurality of display electrodes configured to detect proximity of input objects to the first touch-sensitive display; a second touch-sensitive display including a second plurality of display electrodes configured to detect proximity of input objects to the second touch-sensitive display; a hinge disposed between and providing dynamic angular adjustment between the first touch-sensitive display and the second touch-sensitive display; and a touch controller configured to: detect a non-stylus touch input at a first display electrode of the first touch-sensitive display based on a first signal reported by the first display electrode; detect a stylus touch input from a stylus at a second display electrode of the second touch-sensitive display based on a second signal reported by the second display electrode; computer-analyze the first signal to identify an electrical noise affecting the first display electrode; determine a noise-corrected second signal based on the second signal and the identified electrical noise; and determine a two-dimensional position of the stylus touch input relative to the second touch-sensitive display based at least on the noise-corrected second signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive display device, comprising:
   a first touch-sensitive display including a first plurality of display electrodes configured to detect proximity of input objects to the first touch-sensitive display;
   a second touch-sensitive display including a second plurality of display electrodes configured to detect proximity of input objects to the second touch-sensitive display; and
   a touch controller configured to:
      detect a non-stylus touch input at a first display electrode of the first touch-sensitive display based on a first signal from the first display electrode;
      detect a stylus touch input from a stylus at a second display electrode of the second touch-sensitive display based on a second signal from the second display electrode; and
      determine a two-dimensional position of the stylus touch input relative to the second touch-sensitive display based at least on the second signal and noise compensation derived from the first signal.

2. The touch-sensitive display device of claim 1, where the touch controller is configured to computer-analyze the first signal to identify an electrical noise affecting the first display electrode, and based on the identified electrical noise, determine a noise-corrected second signal from the second signal, and where the two-dimensional position of the stylus touch input is determined based on the noise-corrected second signal.

3. The touch-sensitive display device of claim 2, where the touch controller is configured to subtract the identified electrical noise from the second signal to give the noise-corrected second signal.

4. The touch-sensitive display device of claim 2, where the stylus emits an electrical signal having a first frequency, the electrical noise causes detection of a plurality of frequencies by the first and second display electrodes including the first frequency and a second frequency, and the touch controller is configured to compare relative magnitudes of the first and second signals at the first and second frequencies to derive the noise compensation.

5. The touch-sensitive display device of claim 4, where the touch controller is configured to identify a ratio of a magnitude of the first signal at the first frequency to a magnitude of the first signal at the second frequency, and based on the identified ratio and a magnitude of the second signal at the second frequency, estimate a proportion of a magnitude of the second signal at the first frequency that corresponds to the electrical noise.

6. The touch-sensitive display device of claim 1, where the non-stylus touch input corresponds to contact between the first touch-sensitive display and a hand of a user of the touch-sensitive display device.

7. The touch-sensitive display device of claim 1, where determining the two-dimensional position of the stylus touch input based on the noise compensation includes compensating for an electrical noise caused by a difference in electrical grounding between the touch-sensitive display device and a user of the touch-sensitive display device.

8. The touch-sensitive display of claim 7, where the electrical noise is introduced by an electrical power supply of the touch-sensitive display device.

9. The touch-sensitive display device of claim 7, where the electrical noise is introduced by the stylus.

10. The touch-sensitive display device of claim 1, where the stylus is an active stylus.

11. The touch-sensitive display device of claim 1, further comprising a hinge disposed between and providing dynamic angular adjustment between the first touch-sensitive display and the second touch-sensitive display, where the hinge is configured to allow dynamic adjustment into a coplanar arrangement of the first and second touch-sensitive displays.

12. A method for touch input detection on a touch-sensitive display device, the method comprising:
   detecting a non-stylus touch input at a first display electrode of a first touch-sensitive display of the touch-sensitive display device based on a first signal from the first display electrode, the first touch-sensitive display including a first plurality of display electrodes configured to detect proximity of input objects to the first touch-sensitive display;
   detecting a stylus touch input from a stylus at a second display electrode of a second touch-sensitive display of the touch-sensitive display device based on a second signal from the second display electrode, the second touch-sensitive display including a second plurality of display electrodes configured to detect proximity of input objects to the second touch-sensitive display; and
   determining a two-dimensional position of the stylus touch input relative to the second touch-sensitive display based at least on the second signal and noise compensation derived from the first signal.

13. The method of claim 12, further comprising computer-analyzing the first signal to identify an electrical noise affecting the first display electrode, and based on the identified electrical noise, determining a noise-corrected second signal from the second signal, and where the two-dimensional position of the stylus touch input is determined based on the noise-corrected second signal.

14. The method of claim 13, where determining the noise-corrected second signal includes subtracting the identified electrical noise from the second signal.

15. The method of claim 13, where the stylus emits an electrical signal having a first frequency, the electrical noise causes detection of a plurality of frequencies by the first and second display electrodes including the first frequency and a second frequency, and the method further comprises comparing relative magnitudes of the first and second signals at the first and second frequencies to derive the noise compensation.

16. The method of claim 15, further comprising identifying a ratio of a magnitude of the first signal at the first frequency to a magnitude of the first signal at the second frequency, and based on the identified ratio and a magnitude of the second signal at the second frequency, estimating a proportion of a magnitude of the second signal at the first frequency that corresponds to the electrical noise.

17. The method of claim 12, where the non-stylus touch input corresponds to contact between the first touch-sensitive display and a hand of a user of the touch-sensitive display device.

18. The method of claim 12, where determining the two-dimensional position of the stylus touch input based on the noise compensation includes compensating for an electrical noise caused by a difference in electrical grounding between the touch-sensitive display device and a user of the touch-sensitive display device.

19. The method of claim 18, where the electrical noise is introduced by an electrical power supply of the touch-sensitive display device.

20. A touch-sensitive display device, comprising:
- a first touch-sensitive display including a first plurality of display electrodes configured to detect proximity of input objects to the first touch-sensitive display;
- a second touch-sensitive display including a second plurality of display electrodes configured to detect proximity of input objects to the second touch-sensitive display;
- a hinge disposed between and providing dynamic angular adjustment between the first touch-sensitive display and the second touch-sensitive display; and
- a touch controller configured to:
  - detect a non-stylus touch input at a first display electrode of the first touch-sensitive display based on a first signal reported by the first display electrode;
  - detect a stylus touch input from a stylus at a second display electrode of the second touch-sensitive display based on a second signal reported by the second display electrode;
  - computer-analyze the first signal to identify an electrical noise affecting the first display electrode;
  - determine a noise-corrected second signal based on the second signal and the identified electrical noise; and
  - determine a two-dimensional position of the stylus touch input relative to the second touch-sensitive display based at least on the noise-corrected second signal.

* * * * *